United States Patent
Duerr et al.

(10) Patent No.: US 7,699,384 B2
(45) Date of Patent: Apr. 20, 2010

(54) SUBFRAME FOR A CHASSIS FRAME OF A UTILITY VEHICLE

(75) Inventors: Rainer Duerr, Wernau (DE); Gerd Martin, Stuttgart (DE)

(73) Assignee: Daimler AG, Stuttgart (DE)

(*) Notice: Subject to any disclaimer, the term of this patent is extended or adjusted under 35 U.S.C. 154(b) by 259 days.

(21) Appl. No.: 11/792,312

(22) PCT Filed: Nov. 25, 2005

(86) PCT No.: PCT/EP2005/012616

§ 371 (c)(1),
(2), (4) Date: Feb. 20, 2008

(87) PCT Pub. No.: WO2006/061108

PCT Pub. Date: Jun. 15, 2006

(65) Prior Publication Data

US 2009/0033127 A1    Feb. 5, 2009

(30) Foreign Application Priority Data

Dec. 6, 2004    (DE) ........................ 10 2004 058 831

(51) Int. Cl.
*B60J 7/00*    (2006.01)
(52) U.S. Cl. ..................................... 296/204
(58) Field of Classification Search ................. 296/204, 296/178, 187.01, 203.01; 180/291, 311, 180/312; 280/124.109, 781
See application file for complete search history.

(56) References Cited

U.S. PATENT DOCUMENTS

| | | | | |
|---|---|---|---|---|
| 2,332,326 A | * | 10/1943 | Lex | 280/63 |
| 3,534,977 A | * | 10/1970 | Wessel | 280/800 |
| 3,580,611 A | * | 5/1971 | McNitt | 280/433 |
| 3,630,541 A | * | 12/1971 | Carlson et al. | 280/124.116 |
| 4,417,526 A | * | 11/1983 | Marulic et al. | 105/406.1 |
| 5,040,826 A | * | 8/1991 | Lovell | 280/6.151 |
| 5,221,103 A | * | 6/1993 | Ehrlich | 280/405.1 |
| 7,178,861 B2 | * | 2/2007 | Yamada et al. | 296/204 |
| 2006/0219462 A1 | * | 10/2006 | Martin et al. | 180/292 |

FOREIGN PATENT DOCUMENTS

| | | |
|---|---|---|
| DE | 66 03 214 U | 7/1966 |
| DE | 196 26 380 A1 | 1/1997 |
| DE | 298 00 368 U1 | 8/1998 |
| EP | 1 231 129 A2 | 8/2002 |
| FR | 1 483 189 A | 6/1967 |

OTHER PUBLICATIONS

International Search Report dated Feb. 23, 2006 with an English translation of the pertinent portions and Form PCT/ISA/237 dated Jan. 2004 (Twelve (12) pages).
German Office Action dated Jun. 28, 2005 with an English translation of the pertinent portions (Nine (9) pages).

* cited by examiner

*Primary Examiner*—Kiran B. Patel
(74) *Attorney, Agent, or Firm*—Crowell & Moring LLP

(57) ABSTRACT

A subframe for a utility vehicle, which is fitted on a chassis frame of the vehicle includes angle profiles which, in the assembled state, form a stable subframe. A plurality of diagonal crosses which are composed of an upper partial cross and a lower partial cross can be arranged between the longitudinal members.

11 Claims, 7 Drawing Sheets

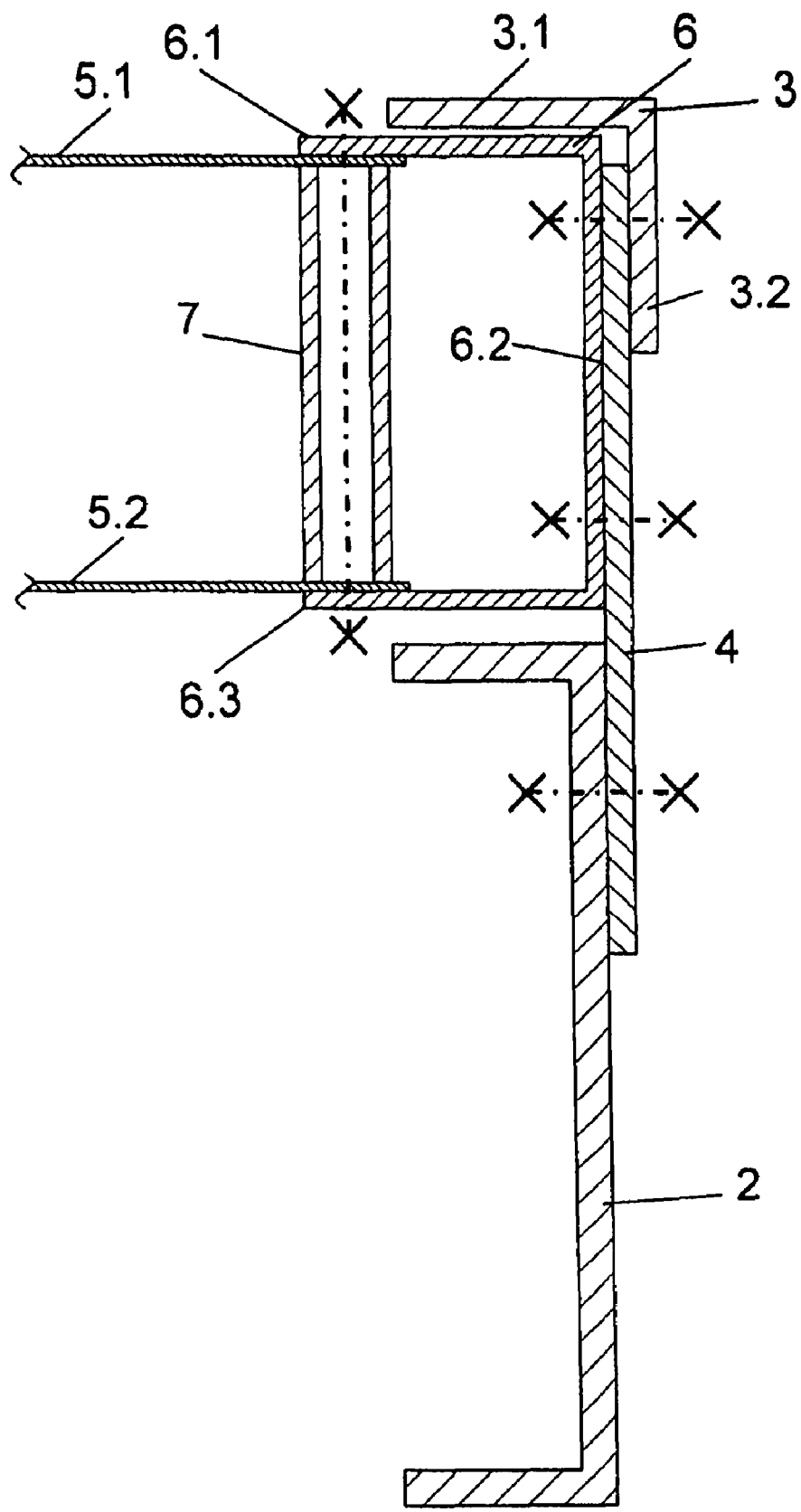

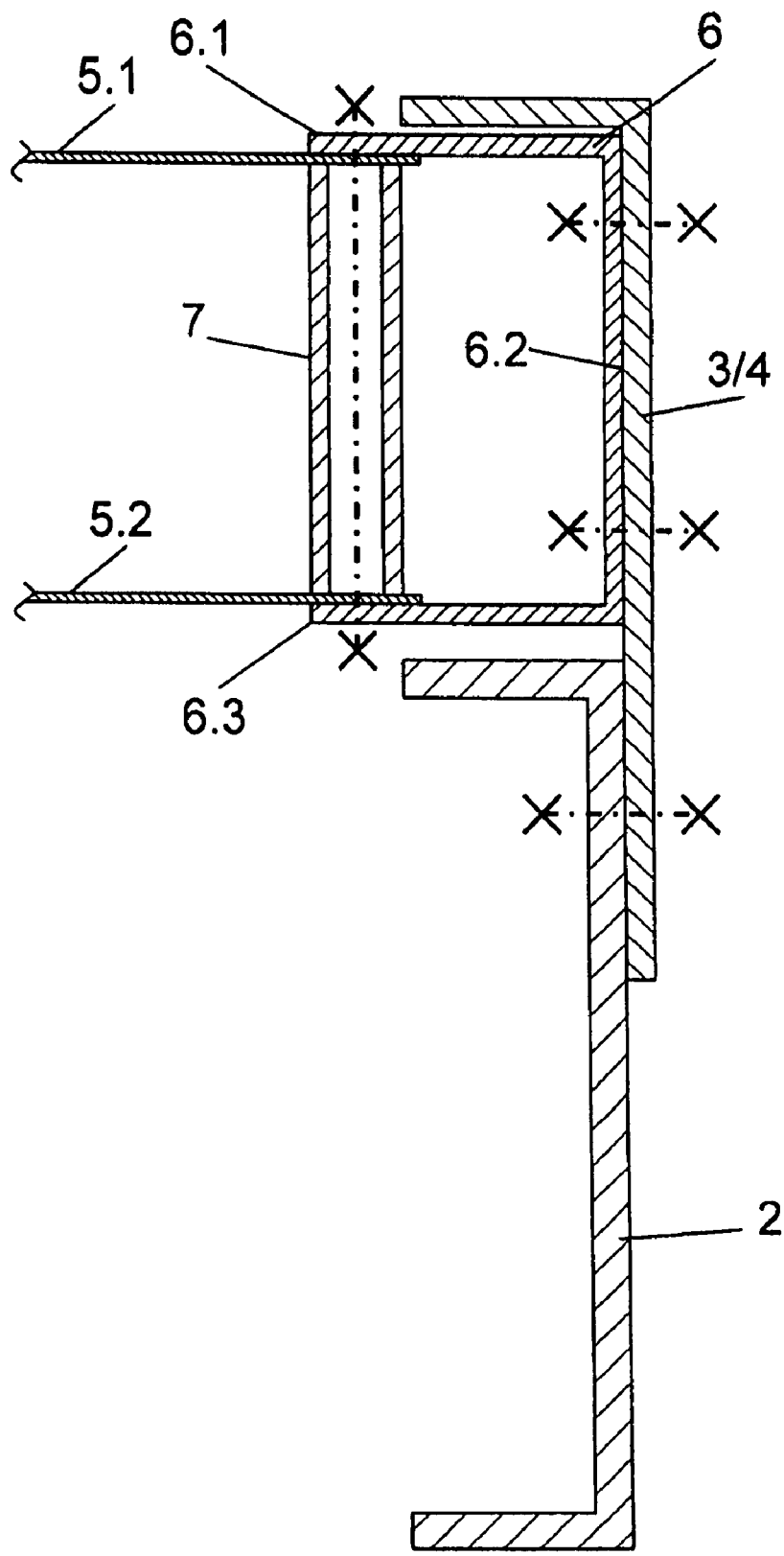

SUBFRAME FOR A CHASSIS FRAME OF A UTILITY VEHICLE

BACKGROUND AND SUMMARY OF THE INVENTION

This application is a national stage of PCT International Application No. PCT/EP2005/012616, filed Nov. 25, 2005, which claims priority under 35 U.S.C. §119 to German Patent Application No. 10 2004 058 831.7 filed Dec. 6, 2004, the disclosure of which is expressly incorporated by reference herein.

The invention relates to a subframe for a utility vehicle.

Utility vehicles which are provided for transporting predominantly heavy loads include, among other things, a chassis frame on which a superstructure for the transportation of the loads is arranged. Furthermore, these chassis frames also serve to receive appliances which are specially to be transported, such as, for example, a mixing drum in the case of a concrete mixer, or a container.

As a rule, the superstructures and subframes provided for them are not provided by the actual manufacturer of the utility vehicle but rather are subsequently fitted individually on the chassis frame of the utility vehicle, depending on the intended use of the vehicle. For this purpose, corresponding connecting mechanisms must be provided between the subframe and the chassis frames.

The basic structure of a subframe essentially comprises two longitudinal members on the chassis frame on both sides of the utility vehicle, which longitudinal members run parallel to each other in the longitudinal direction of the vehicle and are connected via a plurality of crossmembers. To increase the stability, diagonal crosses can be provided, if appropriate in some sections, between the longitudinal members, such diagonal crosses comprising two intersecting oblique struts. At a plurality of points, the subframe has connecting brackets via which it is fastened to the chassis frame. As a rule, the individual support structures are designed as square or rectangular hollow supports made of steel.

A subframe of the generic type, such as disclosed for example in German utility model DE 298 00 368 U1, is connected to the main frame of the chassis exclusively by means of screws. For this purpose, diverse intermediate add-on parts and intermediate angles and also flanges have to be provided in order to form corresponding connecting surfaces between the longitudinal members and crossmembers.

A frame structure which is likewise screwed to the chassis frame is known from German laid-open specification DE 196 25 380 A1. This subframe is to serve as a base for a superstructure for, for example, a box, a tank or a loading platform, and is connected to the chassis via diverse securing elements on the longitudinal members of the subframe. In this connection, grids of holes in the form of a matrix are provided on the securing elements to a sufficient extent such that positioning in different positions in relation to the chassis is possible in order to compensate for dimensional measurements in chassis frames of different manufacturers.

In subframes of this type, it is generally desirable to obtain savings of weight, where possible, and nevertheless to ensure adequate stability in order to support the load to be transported by the utility vehicle. Furthermore, weld seams are to be avoided in subframe structures of this type, since they lead (with the loads to be supported) to considerable stress concentrations which, in the most unfavorable cases, lead to failure.

One object of the present invention is to provide a subframe of the type described above, which achieves a further saving of weight with at least constant or improved stability.

Another object of the invention is to achieve a more favorable dissipation of the forces originating from the load to be supported without substantial deformations within the individual components of the subframe with welding work being avoided in the subframe.

These and other objects and advantages are achieved by the subframe for a utility vehicle according to the invention, in which the two mutually opposite longitudinal members are designed as continuous L-shaped angle profiles. The horizontal arms of the angle profiles of the longitudinal members form the upper edges of the subframe and the vertical arms of the angle profiles form the lateral, outer edges of the subframe. In other words, the two L-shaped angle profiles are located opposite each other, and oriented in opposite directions.

In one embodiment of the invention, the connecting webs, by which the subframe is to be secured on a chassis frame of a utility vehicle, are designed as separate, flat web plates.

In a preferred embodiment, the connecting webs are formed integrally with the longitudinal members. In this case, the vertical arms of the longitudinal members extend at certain points to such a length that they make connection to the chassis frame possible.

The heights of the connecting webs are determined depending on the chassis frame on which the subframe is to be secured. The positions of the individual connecting webs within the continuous longitudinal members are likewise provided at corresponding points, and therefore can be matched with the grids of holes provided on the chassis frame.

The rigidity and strength (in particular flexural strength) of the subframe about the transverse axis of the vehicle can be influenced by a different configuration, particularly by selection of heights of the connecting webs. That is, depending on the load to be supported by the subframe, different frame heights for the subframe can be defined by selection of the heights of the connecting webs.

By defining the wall thickness of the metal sheet of the longitudinal members, the moment of inertia and also the moment of resistance of the entire longitudinal member composed of the chassis frame and the subframe can be correspondingly influenced, depending in each case on the intended use. In other words, in the case of extremely heavy loads which are to be supported by the utility vehicle with a frame structure of this type, the wall thickness of the two L-shaped longitudinal members and/or of the other component elements of the subframe is correspondingly increased.

This ensures a sufficient degree of stability and at the same time a saving of weight, since neither the continuous longitudinal members nor the individual connecting webs are designed as, for example, U-shaped or square hollow profiles.

As is customary in the case of frame structures of this type, at least one diagonal cross can be arranged between the two longitudinal members.

In a particular embodiment according to the invention, the diagonal cross provided for a subframe of this type is constructed in two parts. It is composed of an upper horizontal partial cross and a lower horizontal partial cross. The two partial crosses can be punched out in a sheet-like manner as simple cut sheet-metal parts. Vertically arranged tabs are provided at appropriate points within the partial crosses. Accordingly, the lower horizontal partial cross has upwardly pointing tabs and the upper horizontal partial cross has downwardly extending tabs at points which then correspond. The vertical tabs are bent further outwards in the one longitudinal half of the partial cross by half the thickness of the metal sheet and bent further inwards in the other longitudinal half by the thickness of the metal sheet. The diagonal cross can thus be constructed by two identical partial crosses, with one partial cross being rotated through 180° about the transverse axis of the vehicle and being screwed to the tabs which have corresponding grids of holes.

The partial crosses basically comprise two intersecting oblique struts which are connected at both longitudinal ends by cross struts. Because corresponding tabs are also provided on the cross struts, when the diagonal cross is assembled, and the upper partial cross is screwed to the lower partial cross via the individual tabs, a C-shaped angle support is formed on both cross sides and forms a corresponding degree of rigidity between the two longitudinal members.

Within the diagonal crosses, different profile heights of the entire diagonal cross can also be achieved by different lengths of the bent tabs. In this manner, the rigidity of the diagonal crosses can be influenced in a specific manner. It is thus possible in principle to configure the profile height of the diagonal crosses within the frame structure to be longer than the vertical arms of the angle profiles of the longitudinal members, or shorter or to have a corresponding length.

The rigidity of the diagonal crosses can be controlled not only by different profile heights but also by a specifically selected grid of holes in the vertical tabs.

Within the subframe structure, it is also possible to provide a plurality of diagonal crosses in order to correspondingly influence the rigidity of the subframe. Moreover, it is conceivable for different diagonal crosses to be provided over the entire length, for example a diagonal cross which comprises only a lower or an upper partial cross, and worked diagonal crosses of different heights.

In other words, the torsional rigidity and the shearing rigidity of the subframe can be determined by the number, type and individual positions of the diagonal crosses, depending on the load to be supported by said subframe.

According to the invention, the diagonal crosses are connected to the longitudinal members via U-shaped supports, which are located opposite each other in opposite directions in such a manner that their open sides point towards each other. Thus, the upper arm of the U-shaped supports can come to bear on the horizontal arms of the longitudinal members while the vertical base of the U-shaped supports is in each case connected to the vertical arms of the longitudinal members or to the connecting webs.

The diagonal crosses are connected to the U-shaped supports by, connecting the upper partial cross to the upper arm of the U-shaped support, and connecting the lower partial cross to the lower arm of the U-shaped support, on both of their sides and preferably at each corner of the diagonal crosses.

For the screw connection, the horizontal arms of the U-shaped supports protrude beyond the horizontal arms of the angle profiles of the longitudinal members. At the connecting points to the diagonal crosses, corresponding grids of holes are provided in the diagonal crosses and the horizontal arms of the U-shaped supports.

In one embodiment of the subframe according to the invention, spacers are provided between the connecting points which are each formed between the upper partial cross and the upper arm of the U-shaped support and the lower partial cross and the lower arm of the U-shaped support. These spacers are secured to the diagonal crosses via a grid of holes provided for this purpose.

According to the invention, the diagonal crosses are connected to the longitudinal members by a plurality of vertical screws which reach continuously through the partial crosses, arms of the U-shaped supports and the spacers, which and screw said elements to one another.

In principle, according to the invention, the connections between the individual components (i.e., the longitudinal members, the connecting webs, the diagonal crosses, the U-shaped supports, the spacers and, if appropriate, any cross-members) are realized exclusively via screw connections or rivet connections.

The subframe according to the invention, with components of this type and screw connections is simple to fit and to remove. Furthermore, the invention provides a simple connection to the chassis frame via the connecting webs.

Since the auxiliary frame is constructed from simple punched and/or bent parts which merely comprise a combination of flat metal sheets and U- and L-shaped angle parts, no limit is placed on the freedom to design the subframe with regard to the intended use conditions. Furthermore, the simple parts are inexpensive to produce, since high tool costs are dispensed with.

A further advantage of the subframe according to the invention is that, depending on the use conditions, it can also be stiffened subsequently in a simple manner for example, by fitting additional diagonal crosses or by replacing the upper, L-shaped angle profiles of the longitudinal members with corresponding longitudinal members of thicker metal sheet thickness. Furthermore, the connecting webs and the angle profiles of the longitudinal members are provided with the same grids of elongated holes as the chassis frame, and the individual add-on parts are connected to a large vertical support base.

Since the material which is responsible for the weight is primarily concentrated in the continuous longitudinal members and therefore in the upper edges (or surface-layer zones) of the subframe, a subframe configured in such a manner can be produced with substantially less weight than the conventional type known from the prior art.

Other objects, advantages and novel features of the present invention will become apparent from the following detailed description of the invention when considered in conjunction with the accompanying drawings.

BRIEF DESCRIPTION OF THE DRAWINGS

FIG. 2 is a schematic sectional view of just one side transversely with respect to the longitudinal axis of the subframe from FIG. 1;

FIG. 2a is a schematic sectional view of just one side transversely with respect to the longitudinal axis of the subframe from FIG. 1a;

DETAILED DESCRIPTION OF THE DRAWINGS

Figure 1:
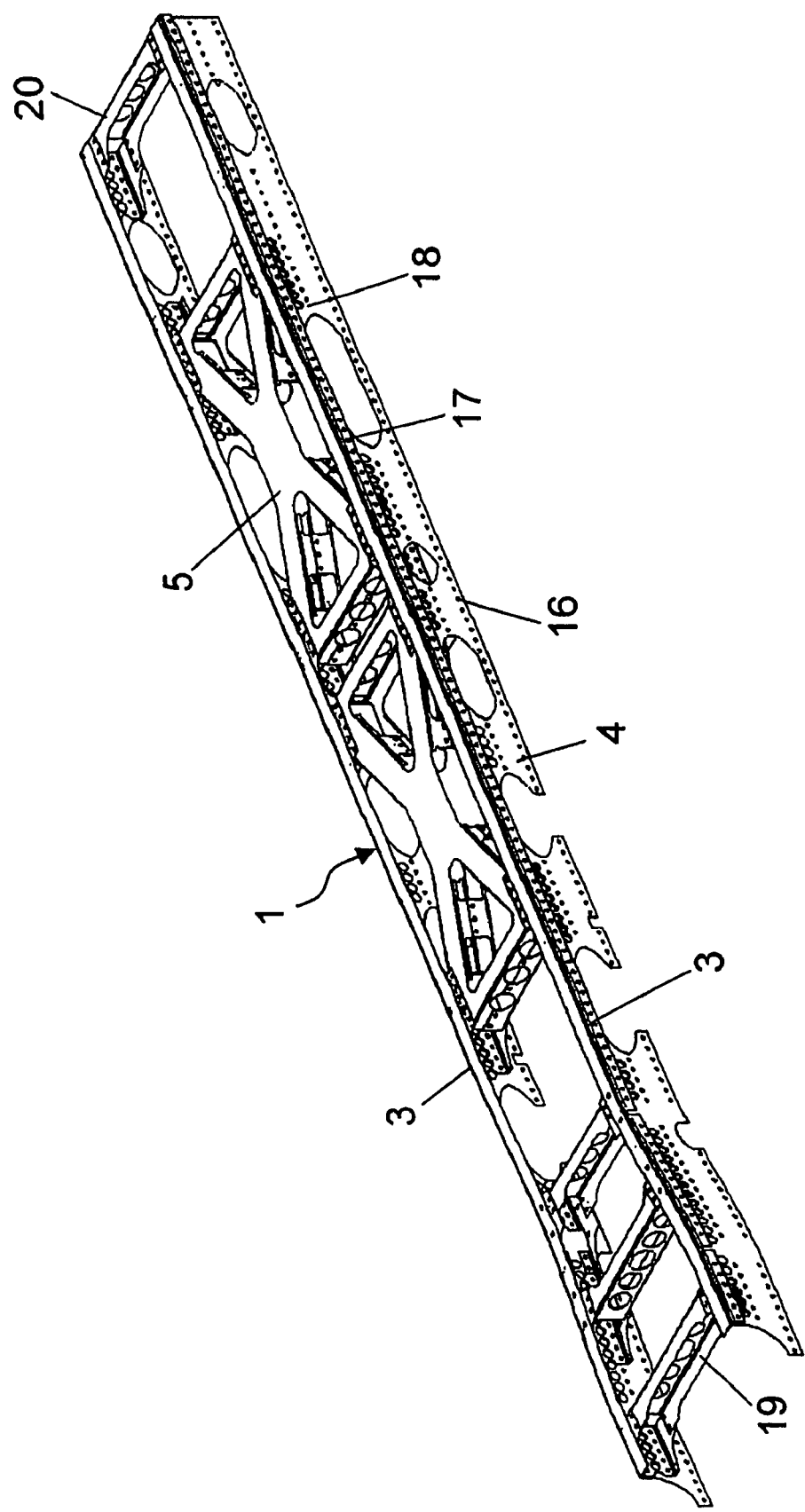
FIG. 1 is a perspective view of a subframe according to the invention with its individual components.

FIG. 1 shows, in a schematic perspective view, a subframe 1 according to the invention. The latter is arranged on a chassis frame 2 (not shown) which is indicated in FIG. 2 by means of one of its longitudinal members.

The subframe 1 comprises two mutually opposite longitudinal members 3 which, as can be seen in FIG. 2, are configured as L-shaped angle profiles. The longitudinal members 3 here are arranged within the subframe 1 in such a manner that the horizontal arms 3.1 of the longitudinal members each form the upper edge of the subframe 1 and the vertical arms 3.2 of the longitudinal member 3 form the lateral, outer edges of the subframe 1.

The subframe 1 furthermore has connecting webs 4 which are arranged on both sides of the longitudinal members 3, and by which the subframe 1 is secured on the chassis frame 2. Depending on the use conditions of the subframe 1, the vertical height of the connecting webs 4 is selected such a that it permits a connection to the longitudinal member of the chassis frame 2.

As can be seen in FIG. 1, the connecting webs 4 are distributed over the length of the subframe 1 or of the longitudinal members 3. Moreover, as can be seen in FIG. 2, U-shaped supports 6 can be connected to the connecting webs 4. For this purpose, a vertical base 6.2 of the U-shaped support 6 is screwed to the connecting webs 4 by means of grids of holes 17 and 18.

Figure 3:
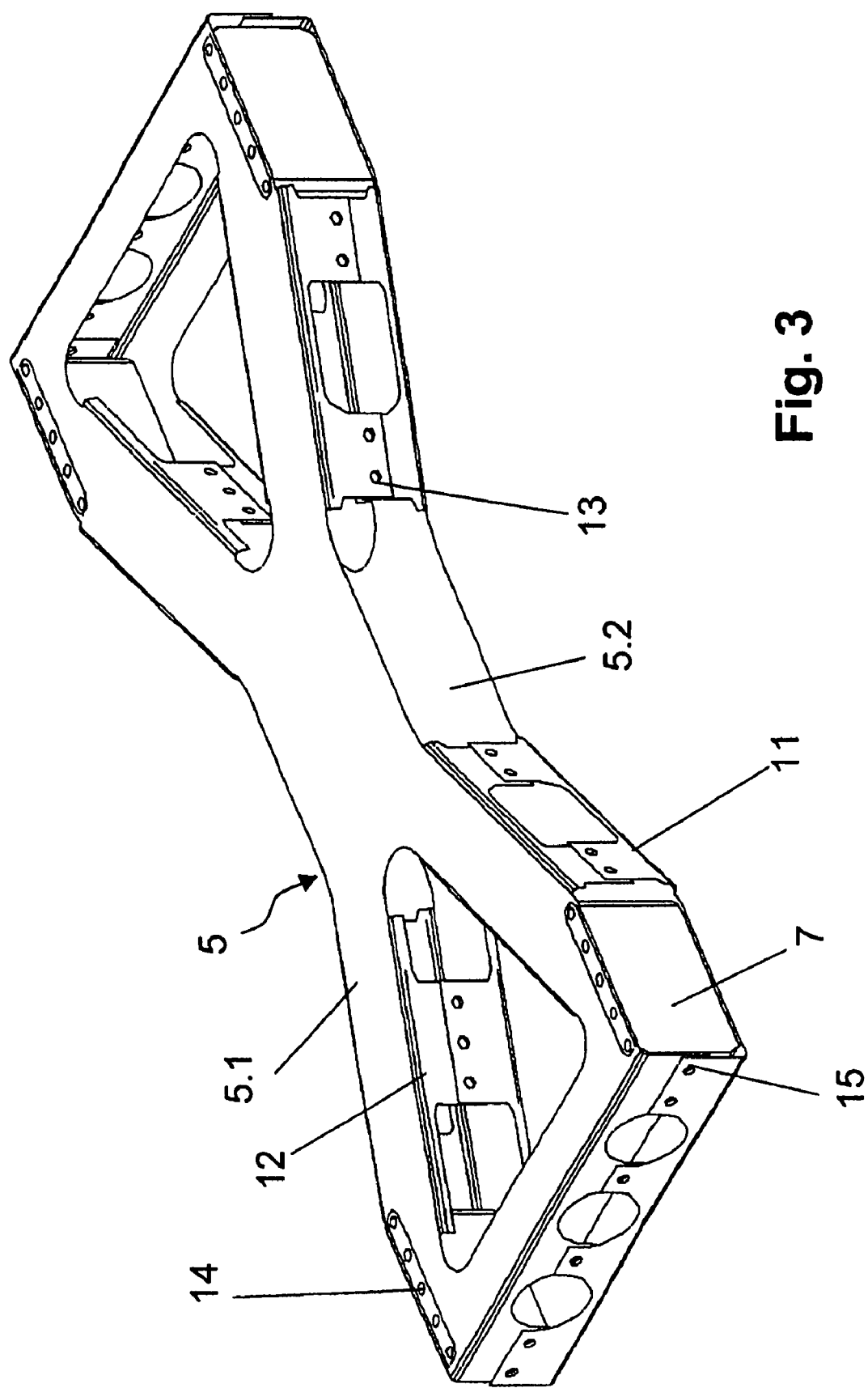
FIG. 3 is a perspective view of an assembled diagonal cross for a subframe of this type.
Figure 4:
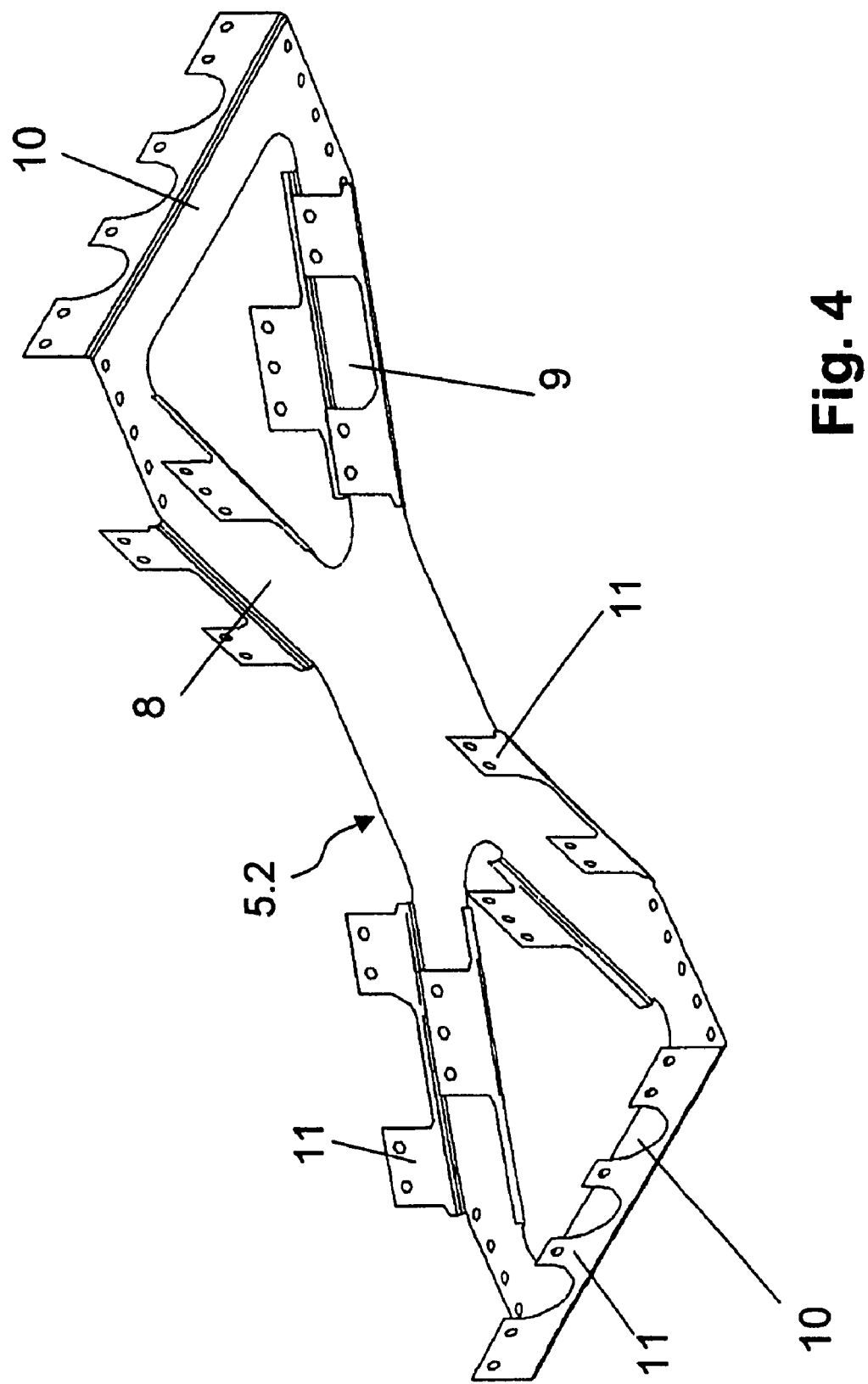
FIG. 4 is a perspective view of a lower horizontal partial cross for a diagonal cross of this type.

In addition, the subframe 1 has a plurality of diagonal crosses 5 which are arranged between the longitudinal members 3. As can be seen in FIG. 3, the diagonal cross 5 comprises an upper horizontal partial cross 5.1 and a lower horizontal partial cross 5.2. As shown in FIG. 4 with reference to the lower horizontal partial cross 5.2, the partial crosses are cut or punched and bent in the form of shaped sheet-metal parts. The lower partial cross 5.2 has tabs 11, which protrude vertically upward, at points of its two oblique struts 8 and 9 and on the cross struts 10. Downwardly protruding tabs 12 are provided at corresponding points of the upper horizontal partial cross 5.1. In the assembled state, the tabs 11 and 12 overlap one another by means of the grids of holes 13 provided in them, and therefore a screw connection or rivet connection can be formed between them.

In the case of the cross struts 10, rigidity-increasing, C-shaped angle profiles within the diagonal cross 5 then form between the longitudinal members 3, as is apparent in FIG. 3.

A diagonal cross 5 worked in such a manner is arranged between the longitudinal members 3 by screwing the upper horizontal partial cross 5.1 (which has a grid of holes 14 at corresponding points), in each case on both sides to the upper horizontal arms 6.1 of the horizontal, U-shaped support 6, and by screwing the lower horizontal partial cross 5.2 to the lower horizontal arms 6.3 of the horizontal, U-shaped support 6, as is apparent from FIG. 2.

A vertically extending spacer 7 is arranged between the connecting points which form between the partial crosses 5.1 and 5.2 and the arms 6.1 and 6.3 of the U-shaped support 6, said elements being screwed to one another by means of screws passing through them vertically.

Figure 5:
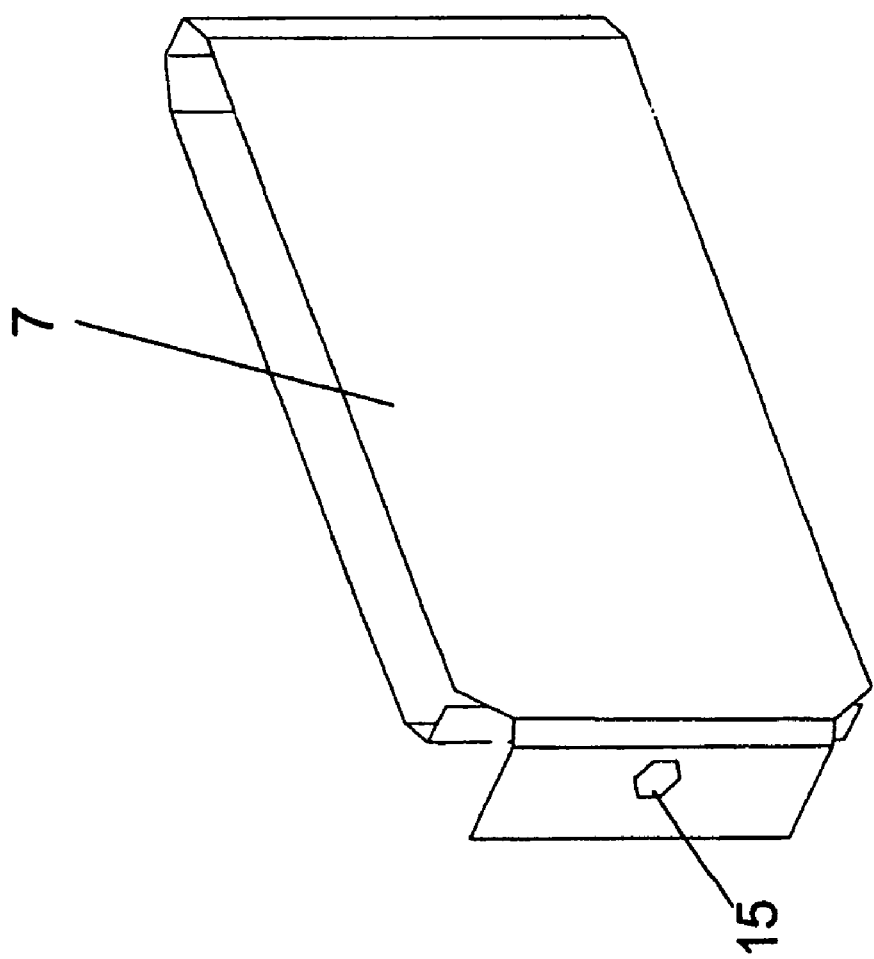
FIG. 5 is a perspective view of a spacer.

As can be seen in FIGS. 3 and 5, the vertical spacer 7 is screwed at a grid of holes 15 to the corresponding grid of holes of the upper partial cross 5.1 and of the lower partial cross 5.2.

At corresponding points, the connecting webs 4 have grids of holes 16 which overlap with corresponding grids of holes on the chassis support in order to be able to form a corresponding screw or rivet connection. Furthermore, a corresponding grid of holes 17 is provided both on the longitudinal members 3 and on the connecting webs 4 for connecting these two components.

For further support, use can be made, for example, of crossmembers 19 and 20 which, for example, are configured in a C-shaped manner and are connected to the horizontal arms 6.1 and 6.3 of the U-shaped support 6.

Figure 1A:
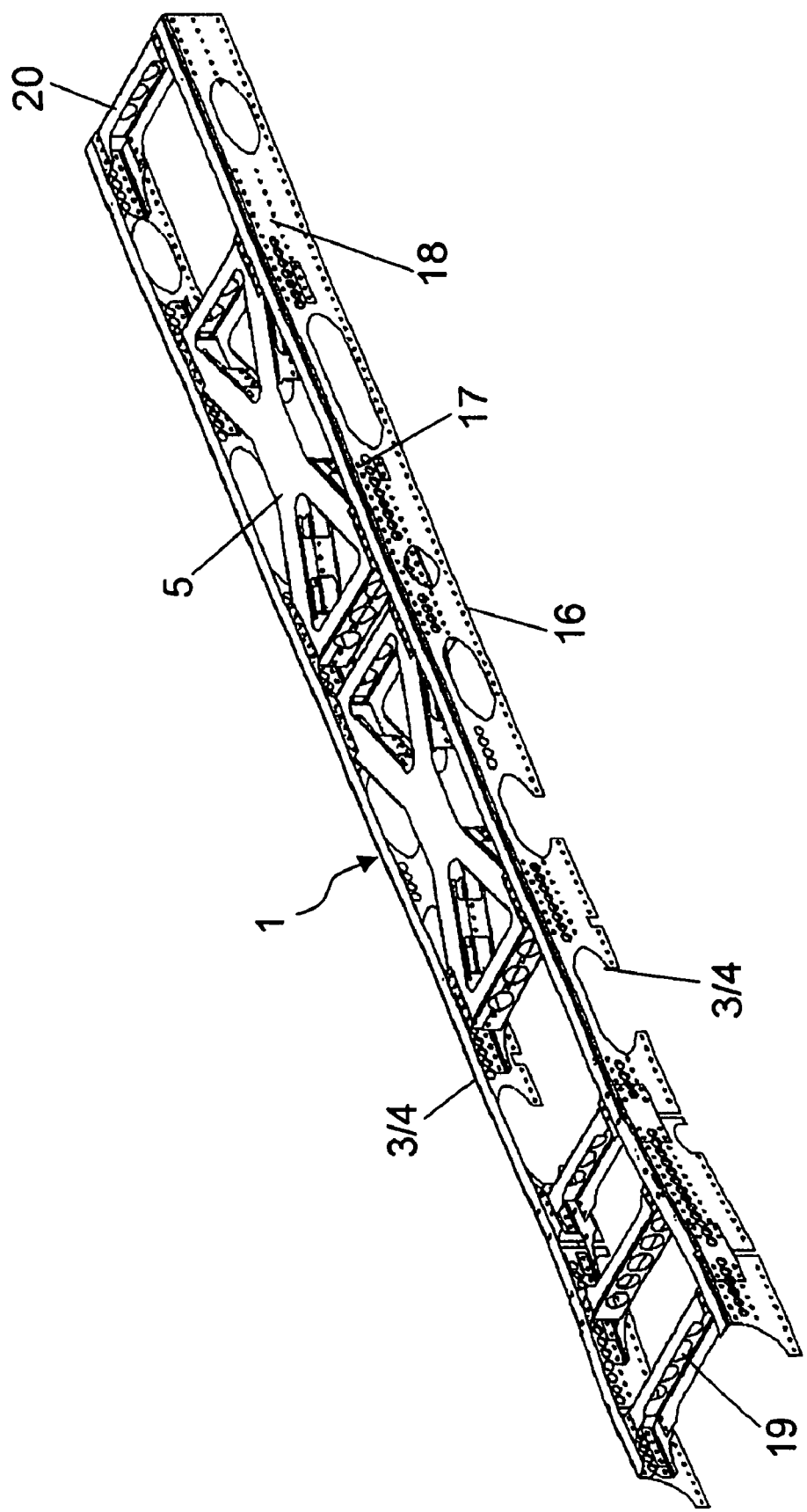
FIG. 1a is a perspective view of a special embodiment of the subframe according to the invention.

FIGS. 1a and 2a show a further embodiment of the subframe 1 according to the invention, in which the longitudinal members 3 and the connecting webs 4 are formed integrally. Accordingly, the vertical base 6.2 of the U-shaped support 6 comes directly to bear against the longitudinal member 3/4.

The individual components of the subframe 1 and the grids of holes provided at corresponding points permit different installation constellations with respect to both the longitudinal axis and the transverse axis. Furthermore, the rigidity and strength of the subframe 1 can be determined in a defined manner by selection of the number, position and dimensions of the individual components. In this manner, it is possible to set the subframe in a specific manner during installation as a function of both the specified chassis frame 2 and the load to be received.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A subframe for a utility vehicle, comprising two mutually opposite longitudinal members which are connected to and fixed relative to each other by crossmembers, and which are securable on a chassis frame of the utility vehicle via a plurality of connecting webs, wherein:
   each of the longitudinal members comprises a continuous L-shaped angle profile with a horizontal arm and a vertical arm;
   the longitudinal members are disposed opposite each other and oriented oppositely, such that the horizontal arms of the angle profiles form the upper edges of the subframe and the vertical arms of the angle profiles form lateral, outer edges of the subframe; and
   U-shaped supports are provided, which lie opposite each other and are oriented oppositely, such that open sides thereof are directed inward, with an upper arm of each U-shaped support bearing on an inside of a horizontal arm of a respective one of the longitudinal members.

2. The subframe as claimed in claim 1, wherein the connecting webs are arranged between the vertical arms of the longitudinal members and the U-shaped supports.

3. The subframe as claimed in claim 1, wherein the vertical arms and the connecting webs are formed integrally.

4. The subframe as claimed in claim 1, wherein at least one diagonal cross is arranged between the longitudinal members.

5. The subframe as claimed in claim 4, wherein:
   the diagonal cross is formed in two parts, including an upper horizontal partial cross and a lower horizontal partial cross; and
   the upper and lower partial horizontal cross are configured to be connected to each other via tabs which are arranged vertically at corresponding points on the upper and lower horizontal partial crosses.

6. The subframe as claimed in claim 5, wherein the tabs are arranged on the upper and lower horizontal partial crosses such that, in their assembled state, C-shaped profiles are formed at least in some sections.

7. The subframe as claimed in claim 4, wherein on both sides, the upper horizontal partial cross is configured to be connected to the upper arm of the U-shaped support and the lower horizontal partial cross is configured to be connected to the lower arm of the U-shaped support.

8. The subframe as claimed in claim 7, wherein spacers are arranged between the connecting points of the partial crosses and the arms of the U-shaped supports.

9. The subframe as claimed in claim 8, wherein the partial crosses, the arms of the U-shaped supports and the spacers are passed through by a continuous connecting means.

10. The subframe as claimed in claim 7, wherein the spacers are configured to be connected to the partial crosses.

11. The subframe as claimed in claim 10, wherein the individual elements are connected to one another by one of screws and rivets.

* * * * *